United States Patent [19]

Stephan et al.

[11] 3,988,479

[45] *Oct. 26, 1976

[54] GELLED PROTEINACEOUS FISH BAIT AND PROCESS OF PREPARING SAME

[76] Inventors: John T. Stephan, 13 Mount Hood Lane; Kurt F. Stephan, 105 James St., Apt. 2, both of Longview, Wash. 98632

[ * ] Notice: The portion of the term of this patent subsequent to Apr. 8, 1992, has been disclaimed.

[22] Filed: Mar. 26, 1975

[21] Appl. No.: 562,266

[52] U.S. Cl. .................................. 426/1; 426/805; 426/576
[51] Int. Cl.² .......................................... A23K 1/18
[58] Field of Search ................ 426/1, 805, 576, 573

[56] References Cited
UNITED STATES PATENTS

| | | | |
|---|---|---|---|
| 2,951,761 | 9/1960 | Stephan .................................. | 426/1 |
| 3,421,899 | 1/1969 | Humphreys ............................. | 426/1 |
| 3,437,488 | 4/1969 | Humphreys ............................. | 426/1 |
| 3,876,803 | 4/1975 | Stephan et al. ......................... | 426/1 |

*Primary Examiner*—Joseph M. Golian
*Attorney, Agent, or Firm*—Christensen, O'Connor, Garrison & Havelka

[57] ABSTRACT

A fish bait and method of production thereof wherein a nonhomogeneous body having a toughened exterior skinlike structure surrounding a gelatinous or fluid body is formed by mixing a gel-forming proteinaceous material and water at a temperature above the sol-gel transition temperature, forming the proteinaceous mass into the desired shape, cooling the shaped mass and treating the exterior surface of the shaped mass with a polymeric tanning agent such as a sulfited melamine formaldehyde resin, resulting in a relatively insoluble skin surrounding a relatively soluble fluid gel center structure. Fluidizing agents reactive with the polymeric tanning agents may be added to alter the gel characteristics, and salmon egg waste material and other fish cannery wastes may be incorporated as part or all of the proteinaceous material to provide the characteristic odor associated with salmon eggs.

21 Claims, No Drawings

GELLED PROTEINACEOUS FISH BAIT AND PROCESS OF PREPARING SAME

BACKGROUND OF THE INVENTION

This invention relates to a process and composition of matter for the production of fish bait.

The art of manufacturing fish bait to catch trout, bass, etc., is quite old and there has developed a considerable industry in collecting, preserving, and enlarging the roe from the Pacific salmon for use as fish bait. Salmon eggs are a preferred bait for lake and stream fishing. The natural supply of salmon egg is limited and due to the competition for salmon roe which is also used to make red caviar, the cost is almost prohibitive. There exists, therefore, a demand for a manufactured salmon egg prepared from readily available raw material not used as foodstuffs by humans. Our copending application Ser. No. 275,148 filed Jul. 26, 1972 now U.S. Pat. No. 3,876,803 issued Apr. 8, 1975; which is a continuation of application Ser. No. 40,722 filed May 22, 1970 and now abandoned, is a disclosure of a suitable composition and process for making manufactured imitation salmon eggs. Application Ser. No. 275,148 now U.S. Pat. No. 3,876,803 is incorporated herein by reference as if fully set forth herein.

The method of the invention disclosed in application Ser. No. 275,148 now U.S. Pat. No. 3,876,803 comprises, in summary the following processing steps: A proteinaceous material which forms a thermally reversible gel in a water solution or mixture is prepared for this process by mixing with water at a temperature in excess of the sol-gel transition temperature. Bait-sized globules are then formed from the mass of proteinaceous sol and then cooled below the sol-gel transition temperature to form a gelatinous mass. The surface of this gelatinous mass is then treated with a curing or tanning agent such as formaldehyde to cross-link the gel forming the exterior into a relatively water-insoluble, skinlike material having an increased sol-gel transition temperature. The tanning process is continued until a thin skin surrounding the main bulk of the gelatinous material is cross-linked. The resulting product may then be packed by known techniques into hermetically sealed containers and sold through usual channels as fish bait.

STATEMENT OF THE INVENTION

The method of this current invention, and the product produced, are an improvement over the disclosure of application Ser. No. 275,148 now U.s. Pat. No. 3,876,803 and comprises the following processing steps: A proteinaceous material which forms a thermally reversible gel in a water solution is prepared for this process by mixing with water and preferably urea at a temperature in excess of the sol-gel transition temperature of the resulting mixture. Simulated fish egg sized globules or other shapes are then formed from the mass of proteinaceous sol and then cooled below the sol-gel transition temperature to form a shaped gelatinous mass. The surface of this gelatinous mass is then treated with a polymeric tanning agent such as the reaction product of melamine, formaldehyde and an alkali metal sulfite in aqueous solution (i.e., a sulfited melamine-formaldehyde resin) to cross-link the surface of the globule into a relatively tough, water-insoluble, skinlike material having an increased sol-gel transition temperature. The resulting product may then be dyed, flavored with fish oil and then packed by known techniques into hermetically sealed containers and sold through the usual channels as fish bait. By proper choice of coloring matter and flavoring, artificial caviar may be produced.

A proteinaceous material suitable for use in practicing this improved processing to produce artificial salmon egg bait imitating the natural salmon eggs may be selected from those proteinaceous materials which are water soluble or water dispersible and capable of giving a thermally reversible solution or dispersion which will undergo gelation upon chilling and which is capable of reacting while in the chilled gel form with a solution of a polymeric melamine-formaldehyde resin to give a tanned skin which is thermally irreversible, thereby making the individual shape resistant to melting at elevated storage temperatures. Suitable protein material includes animal glue, gelatin, fish glue, partially hydrolyzed fish protein from fish skins and fish connective tissue, partially hydrolyzed vegetable protein such as that found in or isolated from the seeds of legumes, i.e., soybean protein, egg albumen, soluble blood albumen, and the like. The preferred materials are fish glue, fish gelatin, animal hide glue, animal bone glue, and animal gelatin. An important feature of the invention is the ability to use a protein material such as animal glue, which in itself is not a food on which trout in salmon spawning streams are accustomed to feed, and to include with it in the mixture used for the original sphere formation a portion of otherwise unusable fish egg material (which may contain proteinaceous material) such as salmon egg skeins, broken salmon eggs, small immature salmon eggs, salt brine in which salmon eggs have been previously soaked or processed containing odor principles identifiable as salmon egg oil, sera, skeins and eggs from other fish and the like which are most conveniently added in a fine ground state. The water-soluble portions thereof, such as egg interiors from broken salmon eggs, the sera, etc., of course, do not require grinding or other processing to render them compatible with the animal glue solution. In the preferred embodiment of this invention, these natural salmon egg protein pieces and other flavoring and protein materials are embedded in a matrix of animal glue in the gel spheres and when used as a bait provide the same attractant odor and taste to the game fish as the whole natural salmon egg. Thus, a new source of bait material is opened up for exploitation in addition to providing a use for otherwise discarded fish cannery waste. Alternately, other fish waste such as eggs from such species as cod, halibut, sturgeon, or the like which are much too small to be used individually by themselves as bait may be included in the protein matrix in a comminuted or whole form and thereby confer on the manufactured bait any natural attraction which they may have toward the game fish, which thereby enhances the bait possibility.

In addition, any fish by-product materials such as salmon milt, fish meal, herring meal, fresh ground scrap fish, brine from fish egg processes and other processing liquids, etc., may be included in the animal glue or similar matrix to enhance the attractiveness of the manufactured bait to trout and other game fish.

By thermally reversible gel is meant a protein and water mixture which is solid, but which liquefies upon a rise in temperature to give a sol. A sol is a liquid colloidal mixture of protein and water. The sol-gel transition temperature is that temperature at which the gel melts to become a sol.

For purposes of this invention the preferred sol-gel transition temperature is a temperature at or above 55° F. to permit convenient handling of the gelled proteinaceous shapes in equipment without excessive refrigeration.

Suitable polymeric or resinous tanning agents are those amino resins prepared by the reaction of melamine with an aldehyde. Including a salt of sulfurous acid in the reaction mixture improves the tanning reaction. Excellent polymeric tanning agents are the water-soluble condensation products of formaldehyde with melamine and alkali metal sulfites. These materials show resinous properties which we theorize indicate the presence of mixed isomers and at least some multiple condensations with more than one moiety of melamine in the molecule.

Other co-reactants such as urea or other aldehydes may be included in the resin forming reaction so long as the tanning function of the sulfited melamine resin is not interfered with.

The preferred salt is sodium sulfite although other alkali metal salts such as potassium sulfite, lithium sulfite, or the like may be used. In forming the preferred polymeric tanning agent the molar ratio of formaldehyde to melamine may vary between approximately 2.5 and 4.66. The molar ratio of alkali metal sulfite to melamine may vary from approximately 0.2 up to approximately 0.8. In general the higher the usage of alkali metal sulfite the higher should be the formaldehyde usage. The cooking cycle or reaction time is only that required for the melamine and formaldehyde to react to give water-soluble products. A reaction time of from 10 minutes to 1 hour at a temperature in the range of 130° to 180° F. provides a workable product. The preferred material is produced by reaction of the mixture at about 150° to 165° F. for 20 to 35 minutes. In preparing a polymeric tanning agent by reacting 126 grams of melaine, 270 grams of 37% formalin, 52 grams of sodium sulfite, and 400 grams of water, we have found the best results at 158°F. for 30 minutes. Longer reaction times and higher temperatures may be used, but care must be exercised to carry out the reaction under sufficiently mild conditions which do not cause premature gelation of the polymeric tanning solution by excess reaction. The higher the viscosity of the polymeric tanning solution the more difficult is penetration into the protein spheres undergoing tanning.

It is an essential part of this invention that the thermally reversible colloidal protein solution is formed into gelled spheres and these spheres are then tanned on the surface with a suitable polymeric tanning agent containing an amino resin such as the reaction product of melamine, formaldehyde, and sodium sulfite in solution which renders the protein insoluble in the solvent and elevates the sol-gel transition temperature. The sol-gel transition temperature of the tanned skin must be higher than any temperature to which the bait may be subjected during manufacture or afterward during storage or use. If a bait is heated during storage to a temperature higher than the sol-gel transition temperature of the bait, it will, of course, block with adjacent spheres and perhaps liquefy or melt. The spherical shape of the bait would thereby be destroyed. In a jar, for example, this could result in one useless blob at the bottom. In carrying out laboratory tests, a temperature of 120°F. is taken as a temperature to which bait could likely be subjected during normal storage. This temperature might be reached during summer months in the trunk of a car or in a display window at a store.

It is desirable that the pH of the manufactured salmon egg bait be within the pH range of natural salmon egg, i.e., pH 5.5 to pH 6.5. This is desirable to make the manufactured egg less distinguishable from the natural salmon egg by the game fish. The storage stability of the manufactured salmon egg is better at an acid pH than an alkaline pH. Resistance to mold and bacteria is better at an acid pH than alkaline pH. Various acids such as hydrochloric, acetic, citric, or the like may be incorporated in the proteinaceous mixture to give the proper pH.

While a satisfactory bait may be manufactured from a water-soluble protein, water, and a polymeric tanning agent, it is desirable to include a plasticizing agent which will maintain the bait in a uniform degree of pliability or softness. Suitable plasticizing agents include humectants such as glycerine and the glycols. Ethylene glycol, di-ethylene glycol, tri-ethylene glycol, tetra-ethylene glycol, and the higher polyethylene glycols having molecular weights up to approximately 4000 are particularly useful. Another class of useful humectant compounds are the derivatives and polymers of propylene oxide such as propylene glycol, di-propylene glycol, tri-propylene glycol and the like. The co-polymers of ethylene oxide and propylene oxide are also useful. Various mixtures of monomeric and polymeric glycols and other humectants may be utilized in this invention to tailor the precise mix viscosity for optimum deposition of the spheres while obtaining the proper pliability, softness, and rubbery character of the finished product. In general a suitable plasticizing glycol is one which is miscible with the water present in the egg forming composition at room temperature and does not form a separate liquid phase under the conditions of use. The matter of choice of humectant is largely a matter of economics since a relatively large number of hydroxyl containing organic compound humectants have been used with animal and fish glue.

While eminently satisfactory fish bait may be prepared from an aqueous mass containing a water-soluble or dispersible protein and a glycol humectant formed into a sphere which is treated on its surface with a polymeric tanning agent prepared from melamine, formaldehyde solution and an alkali metal sulfite, it has been found that extraordinary good results are obtained by incorporating urea in the protein mix. The use of urea enhances the translucency or transparency of the product while simultaneously increasing the rubberiness of the interior. Urea appears to be an exceptionally good plasticizer for protein gels and tends to lower the sol-gel transition temperature. This is particularly noticeable where only aldehyde tanning is employed rather than the polymeric tanning agents of this invention. The aldehyde tanned, urea containing product generally has a lower maximum storage temperature and attempts to improve the storage temperature capabilities of such products by extended exposure to the aldehyde tanning agent resulted in very brittle skins and inadequate heat resistance. When using urea as a component of the synthetic bait mix and using a polymeric tanning agent such as the melamine-formaldehyde-sulfite condensation products, the urea may be present in any amount up to about 5 times the amount of dry protein by weight. Preferably, the ratio of urea weight to dry protein weight may vary between from about 0.5 parts of urea by weight to 1.0 part dry protein to about 2.0 parts urea to 1.0 part dry protein. The inventors theorize that the efficacy of the urea is probably due to its ability to react chemically with the polymeric tanning agent just as the polymeric tanning agent undoubtedly reacts chemically with the amine and acid amide groups in the protein. Thus, a microscopic copolymer molecule consisting of protein, urea, and sulfited melamine formaldehyde resin is probably formed in the gel.

In the following examples animal gelatin is the water dispersible protein used throughout since it is readily available in well-recognized commercial grades of definite gel strength and food grade.

EXAMPLE I

One modification of the manufacturing process whereby fish bait is prepared is as follows: A colloidal solution was made of 100 grams of animal gelatin (grade 15X obtained from Wilson & Co.) having a gel strength of 325 grams on the Bloom gelometer, 300 grams water, 150 grams tri-ethylene glycol, and 150 grams urea by gently heating the mixture over a water bath to a temperature of 180° F. and holding the mixture at this temperature. The solution was stirred gently to avoid foaming and was stirred until homogeneous. This glue solution was then pumped through a ¼ inch diameter copper tube in discrete slugs of volume approximately 0.17 ml. per stroke by a metering pump operating at 60 strokes per minute. The storage reservoir for the glue, the pump, and the copper tubing were all externally heated by means of electric tape heaters maintained thermostatically at the temperature of approximately 180° F. The copper tubing was arranged to have sufficient length and turns for proper flexing to enable the tubing to move in a circular path with the exhaust end of the tubing just above the surface of a cold oil bath. The copper tubing was supported by being attached to a horizontal circular disc which in turn was supported by a free rotating support mounted perpendicularly to the plane of the disc and extending downwardly toward the oil bath surface. The tubing support was mounted a short distance out from the center of the disc and described a circle somewhat smaller than the circumference of the oil tank. The disc was mounted so that its plane was horizontal on a vertical axis above the center of the cold oil bath which enables the disc to rotate in the horizontal plane, the rotation being around the vertical axis. The disc was rotated in an incremental fashion by a rachet and pawl apparatus of 30 steps disposed equally around the circumference of the disc. Enough braking action was obtained from a small brake acting between the plywood disc and its vertical shaft so that while the disc advances 1/30 of its circumference with each stroke of the pawl, the disc came to a stop and remained stopped until the metering pump caused one slug of approximately 0.17 ml. of gelatin mixture to squirt or drop from the outlet of the copper tubing. The gelatin mix was allowed to drop in free fall through about 2 inches of air before hitting the surface of the cold oil. Once the droplet of gelatin mix was below the surface of the cold oil (the oil having a lower specific gravity than the gelatin mix), the surface tension of the glue droplet caused it to assume a spherical shape. The oil was maintained at approximately 24°F. by external refrigeration, the cooling being transmitted through the walls of the tank holding the oil. The oil, which was a refined petroleum product known as White Oil No. 15 (obtained from Standard Oil Company of California) had a viscosity of 350 S.S.U. at 10° F. The time of fall through the 60 inches of cold oil for a sphere of volume 0.17 ml. was about 2 minutes. The specific gravity of the White Oil No. 15 was 0.869 at 77° F. The specific gravity of the gelatin mix was about 1.10 at 70° F. The gelatin mix was liquid at a temperature of 180° F. as it dropped through the air and hit the cold oil. As the sphere sank, heat was abstracted from it and the gelatin mixture congealed progressively from the surface to the interior as soon as the temperature fell below the sol-gel transition temperature for the mixture. The cold solid spheres were caught at the bottom of the cold oil tank in a wire basket. After all of the gelatin mix had been pumped into spheres in the cold oil and the spheres gelled and settled into the basket at the bottom of the tank, the basket was raised and allowed to drain free of the bulk of the occluded White Oil. The cold, solid spheres of gelatin mix were water soluble at this stage of the processing. Spheres dropped into a beaker of 140° F. water, for example, softened, lost their shape, and in about 10 minutes of stirring were completely dispersed. Similarly, spheres in 70° F. water for 24 hours dispersed to give a thin colloidal gelatin solution.

The water-soluble gelled spheres of gelatin mix were then washed with an aqueous detergent solution at 55° F. until the oil film was substantially washed off. The washing cycle took about 3 minutes during which the gelled gelatin spheres did not disperse, but retained their shape. After the washing step, the cold spheres were drained and rinsed twice with cold 55° F. tap water to further remove any occluded oil film and/or detergent. It is not essential that the oil film be completely removed, only that if any film does remain, it should not interfere with the subsequent tanning step. It is essential that the temperature of the wash be between 32° F. and about 70° F. to prevent softening and blocking of the spheres. By blocking is meant the agglomeration of multiple spheres into a sticky mass.

After the washing and rinsing steps, the cold spheres of the gelatin mix were immersed in a tanning solution prepared by reacting about 126 grams (1 mole) of melamine, 270 grams (3.33 moles) of 37% formalin, and 52 grams (0.41 mole) of sodium sulfite (anhyd.) and 400 grams of water for 30 minutes at about 158° F., followed by cooling to room temperature. The pH of this solution was approximately 11.0 and it had a viscosity of about 1.5 centipoise at 70° F. The viscosity was estimated by comparison of efflux times of pure water and the polymeric tanning solution from a standard glass tube. One hundred grams of cold gelatin spheres were tanned for 20 minutes at 60° F. in 400 grams of tanning solution, as prepared above. After the tanning treatment, the eggs were immediately removed and washed under a mild spray of 55° F. tap water to remove any excess tanning solution. The eggs were drained on a colander for 5 minutes and then immersed in a solution of acid orange dye, 0.5 grams of dye in 100 grams of water, for about 3 minutes at 70° F. until they attained a suitable orange-red color. These were then drained free of dye solution, rinsed and drained to substantial dryness, and then packed in salmon oil in hermetically sealed glass jars. These eggs were tested and found to withstand the insertion of a No. 8 fishhook without spliting and to hand well on the hook during casting. The eggs had a diameter of 8–9 mm.

and were remarkably like the natural salmon egg. The product eggs were resistant to melting or fusing together when indurated at 140° F. in an oven for 2 hours. Under these conditions, the interiors were found to be fluid and the surrounding skins strong and tough. When cooled to room temperature, the interiors became slightly rubbery. Trout were found to feed equally on the product bait, when it was compared with commercially available, preserved, natural salmon eggs.

EXAMPLE II

A colloidal solution was made of 100 grams of animal gelatin (Wilson & Co., grade 15×), 200 grams of urea, 300 grams of water, 150 grams of tri-ethylene glycol, and 0.1 gram Fast Red ALS dye (obtained from General Dyestuffs Corp.) by heating the mixture gently on a water bath to a temperature of 180° F. and holding at this temperature while stirring gently until homogeneous. Cold spheres were prepared as in Example I. Spherical, 7–8 mm. diameter, egg shaped, solid gel masses having a toughened skin tanned by immersion for 25 minutes at a temperature of 55° F. in a polymeric tanning solution prepared by reacting 126 grams (1 mole) of melamine, 378 grams (4.66 moles) of 37% formalin, 52 grams (0.41 mole) sodium sulfite (anhyd.) and 400 grams of water for 30 minutes at 158° F. followed by cooling to 55° F. The pH of this solution was 10.8 and it had a viscosity of about 1.75 centipoise. A sample of this tanning solution was allowed to air dry on a glass plate. The resulting film was transparent, noncrystalline and typical of a water-soluble polymer. The eggs, after washing and draining, were packed in herring oil in heremetically sealed jars. The eggs were soft and rubbery and hung well on a No. 8 fishhook and withstood casting. The artificial eggs withstood two hours at 120° F. without change of shape.

EXAMPLE III

A colloidal solution was made of 100 grams gelatin (Wilson & Co., grade 15x) blended with 20 grams of fine ground Chinook salmon egg residue suspension (solids content 23% made by suspending crushed and broken Chinook salmon eggs having an effective solids content of about 46% in an equal weight of water and grinding in a Waring blender until 97% passed through a 325 mesh screen), 300 grams of water, 150 grams urea, and 150 grams tri-ethylene glycol and heating the suspension to 180° F. until all of the gelatin was in solution and the mixture homogeneous. Cold, washed spheres were prepared as in Example I and then tanned. One hundred grams of cold, washed spheres were immersed for 30 minutes at 60° F. in 300 grams of a polymeric tanning solution prepared by reacting 128 grams (1 mole) melamine, 243 grams (3 moles) of 37% formalin, 63 grams (0.5 mole) sodium sulfite (anhyd.), and 400 grams of water for 40 minutes at 175° F., followed by cooling to 60° F. The tanned eggs were washed in 55° F. tap water to remove excess tanning solution, drained and packed in hermetically sealed jars. The eggs exhibited the typical odor of Chinook salmon eggs and made a satisfactory bait. Eggs incubated at 120° F. for 2 hours retained their shape.

EXAMPLE IV

A colloidal solution was made of 100 grams animal gel (Wilson & Co., grade 15×), 150 grams urea, 150 grams tri-ethylene glycol, 300 grams water and 0.1 gram Fast Red ALS dye (obtained from General Dyestuffs Corp.) and 4.0 ml. concentrated HCl (37% by weight, specific gravity 1.18) by heating the mixture gently on a water bath to a temperature of 180° F. and holding at that temperature while stirring gently until homogeneous. Cold spheres were prepared as in Example I. Spherical 7–8 mm. diameter egg shaped solid gel masses were formed having a toughened skin tanned by immersion for 30 minutes at a temperature of 60° F. in a polymeric tanning agent. The tanning agent was prepared by reacting 126 grams (1 mole) melamine, 270 grams of 37% formaline, 52 grams sodium sulfite (anhyd.) and 400 grams water for 30 minutes at 158° F. and then cooling to 60° F. The pH of the tanning solution was 11.0 and it had a viscosity of approximately 1.4 centipoise at 70° F. The tanned eggs were washed in 55° F. tap water to remove excess tanning solution, drained and packed in salmon egg oil in hermetically sealed jars. A pH determination was made in bulk on the eggs by taking 15 grams of eggs before packing in oil, washing them in distilled water to remove any residual tanning solution, mincing them with a razor blade, suspending the minced eggs in 15 milliliters of distilled water, heating the suspension to 212° F. and cooling to 70° F. The pH was measured on a Beckman pH meter model 72. The pH of the tanned eggs was 5.8. Samples of eggs withstood incubation at 120° F. for 2 hours without changing shape. The eggs were virtually indistinguishable from natural salmon eggs and made excellent fish bait.

EXAMPLE V

The procedure of Example IV was followed using 6 ml. concentrated HCl and resulted in a final egg pH of 5.6.

The pH of the proteinaceous shapes may readily be altered to the desired level by soaking in acid solution rather than by incorporating the acid into the proteinaceous mixture.

The applicants have presented by way of the above examples certain of the preferred embodiments of the invention. Variations therefrom will become immediately apparent to one skilled in the art upon consideration of the foregoing disclosures. Such variations are considered to be within the scope of this invention and it is to be understood that such variations may be made without departure from the spirit of the invention. It is the intention therefore to be limited only by the scope of the following claims.

What is claimed is:

1. The process for preparing nonhomogeneous fish bait comprising mixing a gel-forming proteinaceous material and water at a temperature above the sol-gel transition temperature thereof to form a liquid proteinaceous mass;

forming said liquid proteinaceous mass into a fish bait shape;

cooling said shape to a temperature below the sol-gel transition temperature to form a gelled shape; and tanning the surface of the gelled shape with a polymeric tanning agent consisting essentially of an aqueous sollution of a condensation product of melamine with formaldehyde.

2. The process of claim 1 wherein a humectant is added to the mixture of gel-forming proteinaceous matter and water.

3. The process of claim 1 wherein urea is added to the mixture of gelforming proteinaceous matter and water.

4. The process of claim 1 wherein said condensation product of melamine and formaldehyde is co-reacted with an alkali metal sulfite.

5. The process of claim 1 wherein the reaction product of melamine and formaldehyde is co-reacted with sodium sulfite.

6. The process of claim 1 wherein said polymeric tanning agent is prepared by reacting melamine, formaldehyde and an alkali metal salt in water, the molar ratio of formaldehyde to melamine being in the range of approximately 2.5 to 4.66 and the molar ratio of alkali metal sulfite to melamine being in the range of about 0.2 to 0.8.

7. The process of claim 1 wherein said polymeric tanning agent is prepared by reacting one part by weight melamine with about 0.595 to about 1.11 parts by weight formaldehyde in the presence of about 0.2 to about 0.8 parts sodium sulfite in an aqueous solution at 130° F. to 180° F. for 10 to 60 minutes.

8. The product produced by the process of claim 1.

9. The product produced by the process of claim 6.

10. The product produced by the process of claim 7.

11. The process for preparing nonhomogeneous fish bait comprising mixing a gel-forming proteinaceous material and water at a temperature above 140° F. to form a liquid proteinaceous mass;

forming the said liquid proteinaceous mass into spheres having a diameter between 5 and 12 millimeters by dropping said spheres into a cold oil bath;

cooling said spheres to a temperature below 55° F. to form gelled spheres; and washing the gelled spheres substantially free of oil at a temperature below about 70° F.; and immersing the gelled spheres in a solution of the reaction product of melamine, formaldehyde and sodium sulfite to effect a surface tanning of the gelled spheres.

12. A fish bait comprising a nonhomogeneous formed shape of a gelled, aqueous, relatively noncross-linked, water-soluble, proteinaceous matter having a skinlike structure formed by treating the surface of the formed shape with a tanning agent consisting of a solution containing the reaction product of melamine, formaldehyde and an alkali metal sulfite.

13. A fish bait comprising a water soluble center of a gelled, aqueous, proteinaceous material and urea surrounded by a substantially spherical skin which is the reaction product of the proteinaceous material and a solution of the condensation product of melamine, formaldehyde and an alkali metal sulfite.

14. Aqueous gelatin fish bait spheres comprising a thermally reversible gelled center of water-soluble gelatin and urea surrounded by a substantially spherical skin which is the reaction product of the gelatin and a solution of the condensation product of melamine, formaldehyde and an alkali metal sulfite.

15. The process for preparing nonhomogeneous fish bait comprising:

preparing an admixture consisting essentially of a gel-forming proteinaceous material and water at a temperature above the sol-gel transition temperatures thereof in the absence of a tanning agent to form a homogeneous liquid proteinaceous mass;

dividing and shaping said liquid proteinaceous mass into individual shaped elements;

cooling said individual shaped elements to a temperature below the sol-gel transition temperature to form gelled shaped elements; and forming a cross-linked exterior surface on said gelled shaped elements by exposing the exterior of said gelled shaped elements to a tanning agent consisting essentially of the reaction product of melamine, formaldehyde and an alkali metal salt of sulfurous acid at a temperature below the blocking temperature of said gelled shaped elements for a time sufficient to produce toughened proteinaceous fish bait wherein said cross-linked exterior surface is capable of withstanding exposure to a temperature of 120° F. for 2 hours without blocking, said toughened proteinaceous fish bait having a relatively water insoluble exterior surface surrounding a relatively noncross-linked gelatinous body having a substantially higher solubility in water than said exterior surface.

16. The process of claim 15 wherein said homogeneous liquid proteinaceous mass contains waste sodium chloride brine from the natural salmon egg processing industry including therein dissolved and suspended quantities of salmon egg oil and other salmon egg constituents.

17. A fish bait comprising a nonhomogeneous formed shape of relatively noncross-linked, homogeneous, water-soluble proteinaceous matter having a sol-gel transition temperature of less than 140° F. surrounded by a cross-linked exterior surface formed by exposure of individual shaped elements consisting essentially of a homogeneous admixture of a gel-forming proteinaceous material and water to a tanning agent consisting of the reaction product of melamine, formaldehyde and an alkali metal salt of sulfurous acid at a temperature below the blocking temperature of said water-soluble proteinaceous matter to cross-link the protein in the exterior of said shaped elements whereby said fish bait has an exterior surface having a lower solubility than said relatively noncross-linked, water-soluble proteinaceous matter and is capable of withstanding exposure to a temperature of about 120° F. without blocking.

18. The process of claim 15 wherein said proteinaceous material is chosen from the group consisting of animal glue, fish glue, fish gelatin, partially hydrolyzed fish protein from fish skins, fish connective tisue, vegetable protein, egg albumin, soluble blood albumin, fish eggs, fish egg skeins and fish viscera.

19. The process of claim 15 wherein said proteinaceous material further includes milt.

20. The process of claim 15 wherein said tanning agent is prepared by reacting melamine, formaldehyde and an alkali metal sulfite in an aqueous solution for 10 to 60 minutes at 130° to 180° F., the molar ratio of formaldehyde to melamine being in the range of approximately 2.5–4.0 to 1; the molar ratio of alkali metal sulfate being in the range of approximately 0.2–0.8 to 1.

21. The process of claim 20 wherein said tanning agent is prepared at 150° to 165° F. for 20 to 35 minutes.

* * * * *